Patented May 8, 1923.

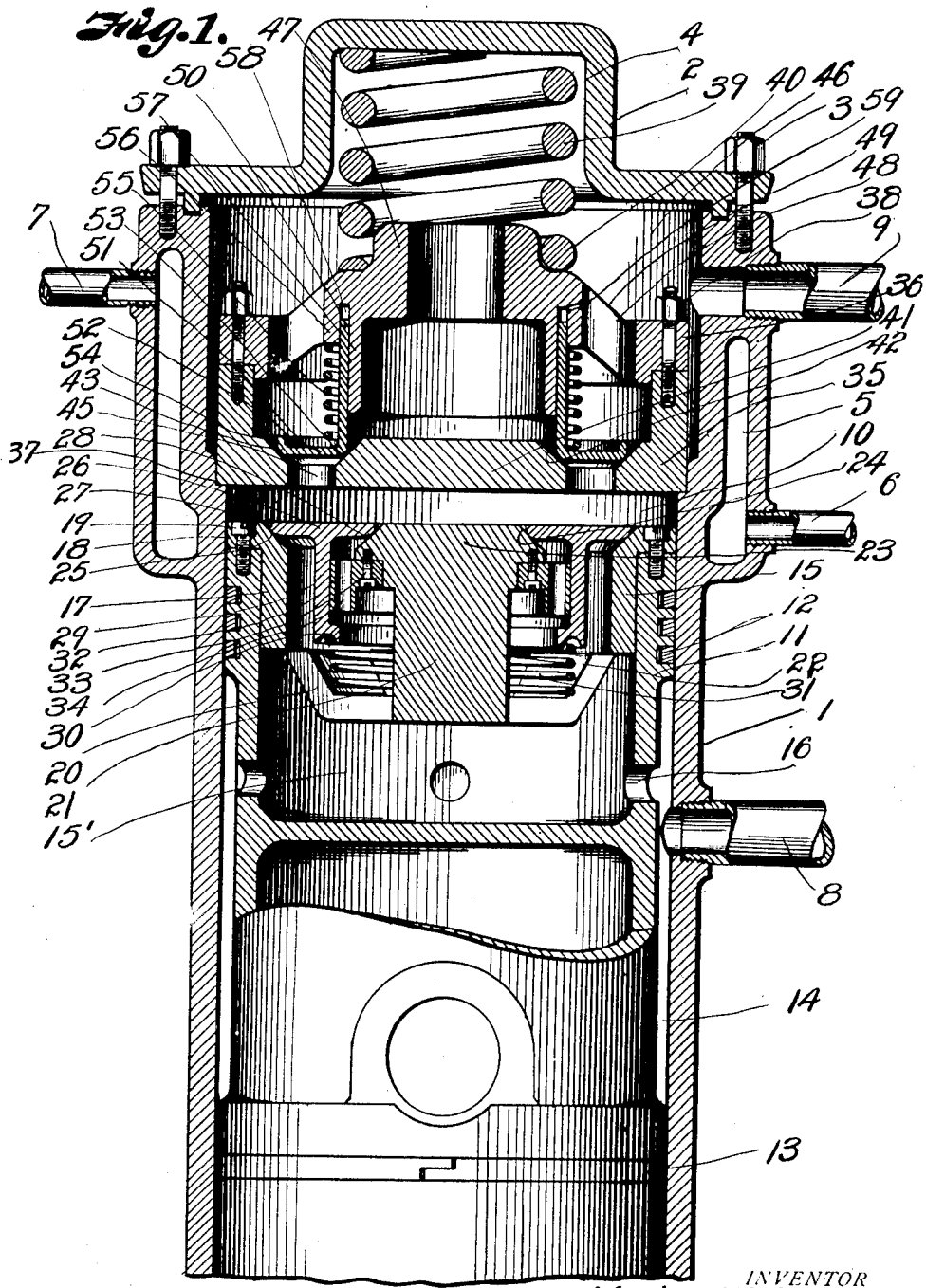

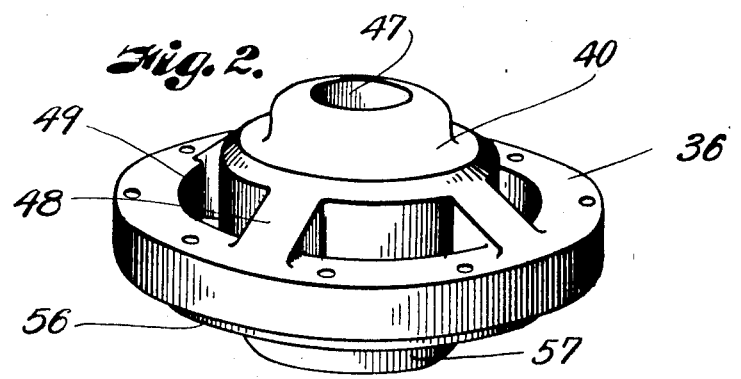
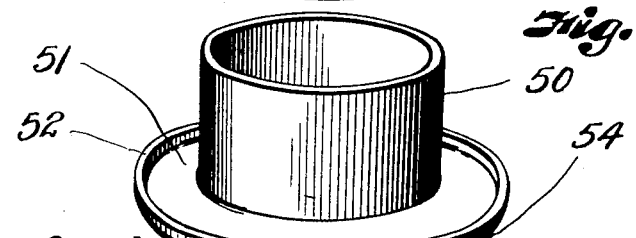
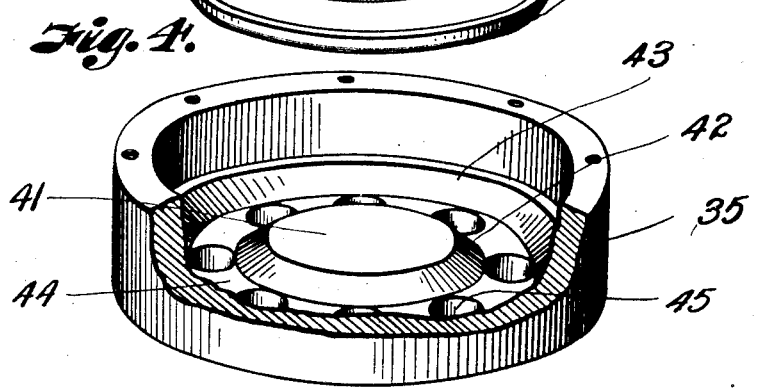
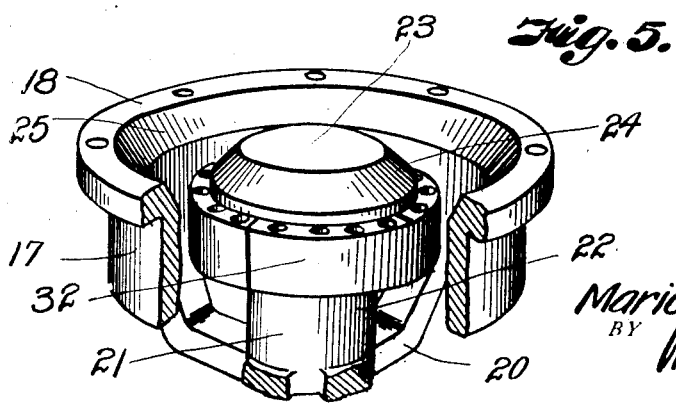

1,454,347

UNITED STATES PATENT OFFICE.

MARION W. STOMS, OF KANSAS CITY, MISSOURI, ASSIGNOR OF ONE-HALF TO LEIGH W. MORRIS, OF KANSAS CITY, MISSOURI.

VALVE FOR COMPRESSORS.

Application filed October 17, 1921. Serial No. 508,145.

*To all whom it may concern:*

Be it known that I, MARION W. STOMS, a citizen of the United States, residing at Kansas City, in the county of Jackson and State of Missouri, have invented certain new and useful Improvements in Valves for Compressors; and I do declare the following to be a full, clear, and exact description of the invention, such as will enable others skilled in the art to which it appertains to make and use the same, reference being had to the accompanying drawings and to the figures of reference marked thereon, which form a part of this specification.

This invention relates to compressors and particularly to a valve mechanism therefor, the primary object being to provide a valve having a port area in such manner that the gases or fluid may pass through the port or ports and into the chamber beyond by flowing over both edges of the valve, it being important according to my invention that the valve which closes the ports be a double edge valve to increase the effective flow through the port area.

Valves for compressors have been provided heretofore of various forms and shapes but the effective portions of the valves are on one edge only, thereby restricting the rate of flow of the fluid. According to my invention, the fluid may pass by both edges of the valve and thereby increase the rate of flow and render the port area more effective for a given size than would be possible under the old conditions, where the fluid flowed past only one edge of the valve.

It is also the purpose of the invention to provide a valve which is light enough to operate at a high speed without pounding or hammering but rugged enough to withstand the stresses under which it will work.

I also contemplate providing a valve which will generally improve the performance of compressors, such as air and gas compressors, and mechanism is so devised that relief may be had whenever slugs of water and the like are received within the compression chamber.

The particularly novel features of my invention will be apparent by reference to the following description in connection with the accompanying drawings, in which Fig. 1 is a vertical, longitudinal, sectional view through a compressor having a valve mechanism for the piston and a valve mechanism for the cylinder head, constructed in accordance with my invention.

Fig. 2 is a disassociated view of one member of the valve casing or head.

Fig. 3 is a perspective view of the outlet valve per se.

Fig 4 is a bottom view of the valve casing for guiding the outlet valve, parts being broken away to show the valve seat, and Fig. 5 is a fragmentary, perspective view of a suction valve.

A compressor cylinder 1 is closed by a removable cylinder head 2, fastened to the cylinder by the fastening bolts 3. The head is provided with a spring seat or recess 4. The portion of the cylinder to receive the compressed charge is provided with a water jacket 5, provided with an inlet pipe 6 and an outlet pipe 7, so that cooling water can be admitted to the jacket and flow therethrough. The cylinder is also provided with an inlet port 8 and a discharge port 9, between which and within the cylinder is a compression chamber 10. The piston 11 is of conventional design, such as commonly used in the enclosed crank type of compressor. The piston is in sliding contact with the wall by reason of the sets of piston rings 12 and 13, there being an annular space 14 intermediate the ends which communicates with the intake pipe 8 and with the suction valve 15 through the port 16. The suction and compression end of the piston is closed by a valve cage shown as comprising a ring 17 and a lateral flange 18, fastened to the end of the piston by the machine screws 19. The ring 17 has downwardly and laterally extending spider arms 20 supporting the integral, central, upstanding member 21, constricted at its lower portion to form a post 22, and having a head portion 23 at its upper end, provided with an inclined edge 24 complementary to the inclined edge 25 on the ring 18 to provide a double valve seat for the ring valve 26. The inner and outer edges of the ring valve are inclined as at 27 and 28, one to rest upon the valve seat 25 and the other upon the valve seat 24, and said ring valve is provided with a depending web 29, having an annular groove or spring seat 30 at its lower end, against which one end of a spring 31 may bear, the other end resting upon the spider arms 20, as will be clearly seen in Fig. 1, The head 23 on the post 22 is off-set with respect to the post portion, and about the off-set portions are segments 32 which may be fastened to the under part of the off-set portions by machine screws 33, as in Fig. 1. The segments form a ring which constitutes a guide for the web 29 to hold it in place and maintain it centered with respect to the ring shaped port formed by the ring 18 and the head 23.

The segments are provided with vertical ports 34 so as to not reduce the effective port area covered by the valve 19 any more than is absolutely necessary. It will be seen that the ring 18, the spider arms, the post 22, and the head 23 are all cast integral and that the valve can be introduced as shown and then the segments fastened to the head so that the valve is covered and by referring to Fig. 1, it will be seen that the grooved portion of the web which constitutes the spring seat extends inwardly beyond the edge of the guide formed by the segments 32 so that the outward or unseating movement of the valve will be limited.

When the piston is moving on its outstroke, the air will enter from the pipe 8 through the port 16 into the chamber 15′, unseating the valve and passing into the compression chamber 10. Because the valve is a ring shaped valve with both edges raised off the seats and moving in such a manner that the space between both edges of the valve will be twice the effective port area of one edge, it will be seen that the combined port area will allow the air to pass from the chamber 15 into the chamber 10 with more facility, and that when the piston moves to its inward or compression stroke, it will unseat the discharge valve to allow the air to pass into the pipe 9. The discharge valve is shown as comprising a valve cage consisting of the members 35 and 36. The member 35 is seated upon the off-set or shoulder portions 37, and the member 36 is fastened thereto by the stud bolts 38. The valve cage consisting of the members 35 and 36 is normally held upon the seat 37 by a compression spring 39, one end of which bears against the end of the spring seat 4 and the other against the spring seat 40 on the member 36. The member 35 is provided with a ring, having a floor member 41 integral therewith and having oppositely inclined valve seats 42 and 43, connected by a web 44, having a circular series of perforations or holes 45 therein, through which air may pass from the compression chamber 10 into the discharge chamber 46.

It will be observed that the member 36 of the valve cage consists of a ring having central spring seat in the form of a hollow ring or collar 47, which carries the spring seat 40. The collar 47 has a central opening through which air may pass from the ports 45, and the portion 47 is connected to the ring by spider arms 48, providing spaces 49 through which air may pass from the ports 45 when the valve is unseated.

The valve is best shown in Fig. 3, as comprising a sleeve 50 having an integral lateral valving flange 51 with a turned-up, inclined edge 52. The bend or angle at 53 and 54 is acute so that there will be sliding contact of the valve on the seats, while the valve will seat and unseat readily under the action of the spring or the air, as the case may be.

The spring for seating the valve is designated 55 and it bears against the top of the flange 51 and against the bottom of the web 56, there being a depending guide web 57 parallel with the web 56 and forming a check recess or compression chamber 58 in which the upper edge of the valve slides, the recess 58 having a discharge port 59 at its upper end so that as the air is compressed within the chamber, it may escape as fast as it is compressed. The two will, in effect, form a dash pot constituting a check for the valve so that the liability of its making noises will be reduced to a minimum if not almost avoided. The flange 57 does not extend down to the floor 41 of the member 35 so that there is a space between the lower edge of the flange 57 and the floor 41 so that the air may pass on the inside wall through the ported portion 47 as well as through the spaces between the spider arms.

For simplicity of construction I may construct the member 35 of one piece and the member 36 of another and assemble the parts with the valve, operating as shown. Therefore, the valve will consist of the two members 35 and 36, the valve member 50 and the spring for maintaining it upon its seat. When the air is compressed in the chamber 10, the valve 50 will unseat, allowing the air to pass both edges of the valve through the ported portion 47 and the spaces 49, thereby facilitating passage of the air through pipe 9.

If a slug of water or moisture should reach the chamber 10 and tend to interfere with the proper operation of the machine, the entire valve cage consisting of members 35 and 36 will move against the tension of spring 39 to relieve the undue pressure and thereby save disruption of the compressor. Ordinarily, however, the spring 39 will be sufficient to maintain the valve cage for the outlet valve upon its seat and only the valve 50 will seat and unseat.

I have endeavored to construct the operating valve in a simple, conveniently assemblable manner so that the necessity for moving the parts in carrying out the invention will be eliminated. While the construction of the member 55 is such that the ports 45 must be formed in the floor thereof to permit passage of the air, the necessity for utilizing the web portions between them will be counteracted, but the valve which covers the ports raises off its seat so that the air may pass by the outer and inner edges of the ring, thereby making a relatively large effective port area for the passage of air into the upper portions 46 of the compressor to be discharged through pipe 9.

I may vary more or less the exact details of construction of the device, but I reserve the right to make such changes and alterations as properly come within the scope of the appended claims.

What I claim and desire to secure by Letters-Patent is:

1. In combination with a valve cage comprising a ring having a floor portion with an annular groove provided with oppositely inclined edges to form valve seats, and having openings through the floor of the groove, a complementary member carried by the ring and comprising a valve guide, a spring pressed valve reciprocally guided by the complementary member, the valve being capable of bodily moving off the valve seats to permit air to pass both edges thereof and a guiding sleeve integral with the valve having a sliding contact with the complementary member.

2. A valve cage comprising a ring having an integral floor provided with an annular groove, the edges of which are inclined to form valve seats, the floor of the groove having openings or ports therein, a complementary member secured to the ring, a guide flange carried by the complementary member, a spring pressed sleeve guided by the complementary member, and a ring shaped valve integral with the sleeve, the inner and outer edges of which are adapted to rest upon the seats, the ring shaped valve being movable therefrom to permit air to pass between the inner and outer edges of the valve and the seats.

3. A valve cage comprising a ring, having a valve seat at one end thereof, a circular member having a valve seat complementary to the valve seat in the ring, and the circular member being integral with the ring, and a spring pressed ring valve, the inner and outer edges of which normally rest upon the seats, the valve being movable from the seats to permit air to pass by the inner and outer edges thereof and a guiding sleeve integral with the ring valve.

4. A valve cage comprising a ring, complementary valve seats spaced one from the other and integral with the ring, a spring balanced ring shaped valve normally resting upon the valve seats but movable therefrom to permit air to pass through the spaces between both edges of the valve and the valve seats, and a guiding sleeve integral with the ring-shaped valve.

5. A valve cage comprising a ring having an integral floor portion provided with openings arranged in circular series and having valve seats on opposite sides thereof, a complementary member fastened to the ring and spaced from the floor, the complementary member having a central portion connected to the outer portion thereof by spider arms, the central portion of the complementary member having a central opening, means for securing the complementary members together, and a spring pressed, slidable valve carried by the complementary member and movable into engagement with the valve seats.

6. In a compressor valve mechanism, a cylinder and a piston having an inlet valve, a shoulder in the cylinder, a discharge valve cage on the shoulder, a spring, one end of which bears against the cylinder head, and the other against the valve cage, an annular groove in the valve cage provided with valve seats on opposite sides, having openings through the floor of the groove, a spring-pressed ring valve movable into engagement with the valve seats, and a guiding sleeve integral with the ring valve.

7. In combination, a valve cage comprising a ring having an integral floor portion provided with openings arranged in circular series and having valve seats on opposite sides thereof, a complementary member carried by the ring and comprising a valve guide, a guiding sleeve having a sliding contact with the complementary member, a spring-pressed, ring-shaped valve integral with the guiding sleeve and movable into engagement with the valve seats, and means for yieldingly supporting the valve cage.

In testimony whereof I affix my signature.

MARION W. STOMS.